United States Patent [19]

Strobl

[11] Patent Number: 4,956,572

[45] Date of Patent: Sep. 11, 1990

[54] COMMUTATOR FOR AN ELECTRIC MOTOR

[75] Inventor: Georg Strobl, Repulse Bay, Hong Kong

[73] Assignee: Johnson Electric S.A., La Chaux de Fonds, Switzerland

[21] Appl. No.: 340,827

[22] Filed: Apr. 20, 1989

[30] Foreign Application Priority Data

Apr. 20, 1988 [GB] United Kingdom ................. 8809271

[51] Int. Cl.[5] ............................................. H02K 13/04

[52] U.S. Cl. ....................................... 310/233; 310/42; 310/234

[58] Field of Search ................................ 310/233-237, 310/42, 227, 228, 219, 232, 248

[56] References Cited

U.S. PATENT DOCUMENTS

| | | | |
|---|---|---|---|
| 1,898,929 | 2/1933 | Apple | 310/235 |
| 4,342,933 | 8/1982 | Gerlach | 310/234 |

FOREIGN PATENT DOCUMENTS

| | | | |
|---|---|---|---|
| 0162577 | 4/1955 | Australia | 310/235 |
| 0090685 | 5/1983 | European Pat. Off. | |
| 0293954 | 12/1987 | Japan | 310/233 |
| 0281860 | 12/1927 | United Kingdom | 310/235 |
| 630807 | 10/1949 | United Kingdom | |
| 816033 | 7/1959 | United Kingdom | |
| 1223677 | 3/1971 | United Kingdom | |
| 2128818 | 5/1984 | United Kingdom | |
| 2203292 | 10/1988 | United Kingdom | 310/234 |
| 2206247 | 12/1988 | United Kingdom | 310/235 |
| 2207292 | 1/1989 | United Kingdom | 310/233 |
| 87/01521 | 3/1987 | World Int. Prop. O. | |

OTHER PUBLICATIONS

Search Report, dated Jun. 19, 1988, 3 pages.

*Primary Examiner*—R. Skudy

*Attorney, Agent, or Firm*—Fleit, Jacobson, Cohn, Price, Holman & Stern

[57] ABSTRACT

An assembled commutator comprises a base carrying segments. Each segment has a tang with laterally extending arms which are folded into recesses in a collar supporting the tangs. An edge 30 of each arm abuts a wall of a recess to prevent axial movement of the segments.

11 Claims, 2 Drawing Sheets

COMMUTATOR FOR AN ELECTRIC MOTOR

FIELD OF THE INVENTION

The present invention relates to a commutator for an electric motor, and in particular to an assembled commutator for a fractional horsepower permanent magnet direct current motor.

BACKGROUND OF THE INVENTION

One type of assembled commutator comprises a plastic base supporting a plurality of segments. The segments are form locked to the base, for example by providing tongues on the segments which are received in recesses in the base. Each segment has a tang which extends radially outwards and has a U-shaped portion which may be supported by a collar at one end of the base. To connect an armature coil to the segment, the coil wire is wrapped into the base of the U-shape which is then collapsed onto the wire and heated in a hot forging or resistance welding process to burn off the insulation covering on the wire and form an electrical and mechanical connection with the wire. The segments are usually slid axially onto the base, in the direction of the collar.

In many applications the electric motors are subject to high G-forces, particularly in motor vehicles where there is often rapid acceleration and deceleration. This may result in axial movement of the segments on the commutator base, which may place a strain on the connection between the segment and the armature winding as well as upsetting the geometry of the commutator.

SUMMARY OF THE INVENTION

The present invention provides an assembled commutator comprising a cylindrical base of electrically insulating material, a plurality of commutator segments mounted on the base, each segment comprising a brush contacting portion which is supported by the base and a generally radially extending tang at one axial end of said brush contacting portion for connection to an armature coil wire, said tang being form locked to said base, characterised in that said form locked connection includes an edge on a radially extending arm, said arm being folded about a line generally parallel to the axial direction of the base and behind a radially extending wall on the base so that said edge bears against said wall to prevent movement of the segment in the direction from said one end to the other end.

By using an edge of the arm, the natural resilience of the segment material, which tends to cause a folded part to spring back slightly, will not affect the fit of the edge of the arm against the wall. By tapering the arm slightly, the arm can be made to pull the segment tightly onto the base as it is folded behind the wall. Other preferred features and advantages of the invention will be apparent from the following description and the accompanying claims.

BRIEF DESCRIPTION OF THE DRAWINGS

The invention will be further described by way of example with reference to the accompanying drawings, in which.

DETAILED DESCRIPTION OF THE PREFERRED EMBODIMENT

Figure 1:
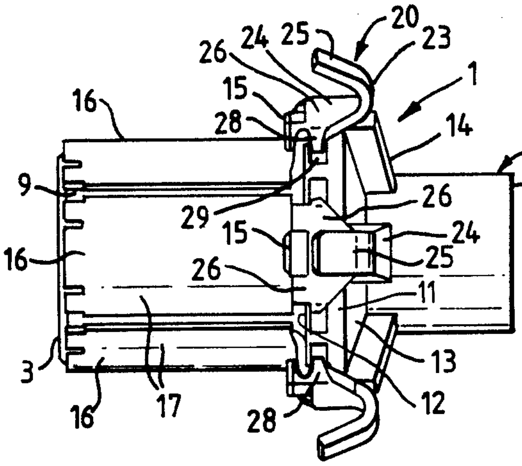
FIG. 1 is a side view of an assembled commutator in accordance with the invention.
Figure 2:
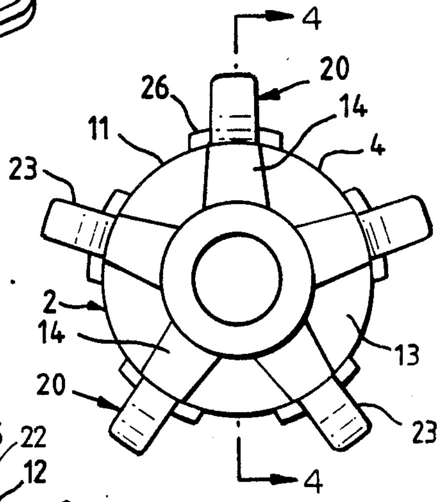
FIG. 2 is an end view of the commutator of FIG. 1.
Figure 3:
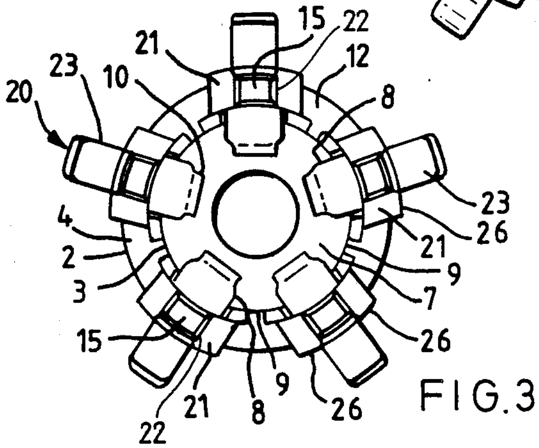
FIG. 3 is a view of the other end of the commutator of FIG. 1.

The drawings show an embodiment of an assembled commutator 1 constructed in accordance with the invention. The commutator 1 comprises an electrically insulating base 2 which is integrally moulded from plastic material, preferably a crystalline polymer material. One such material is marketed under the trade name XYDAR sold by DARTCO Manufacturing Co. of the U.S.A. The base 2 comprises a cylindrical portion 3 having a collar 4 formed at one end, and a stub-like extension 5 extending beyond the collar 4. The base 2 has a cylindrical inner bore 6 for mounting on a motor shaft (not shown). An end wall 7 of the cylindrical portion 3 opposite the collar 4 has recesses which connect the outer surface 9 of the portion 3 with apertures 10 extending into the base from the end wall 7.

The collar 4 is generally cylindrical and has a circumferential outer surface 11, a radially extending front wall 12 and a radially extending rear wall 13. Five, evenly spaced buttresses 14 are formed on the rear wall 13. Five evenly spaced cuboid protrusions 15 are formed on the front wall 12. The protrusions 15 are spaced from the outer surface 9 of the cylindrical portion 3 and level with the outer circumferential surface 11 of the collar 4.

Figure 4:
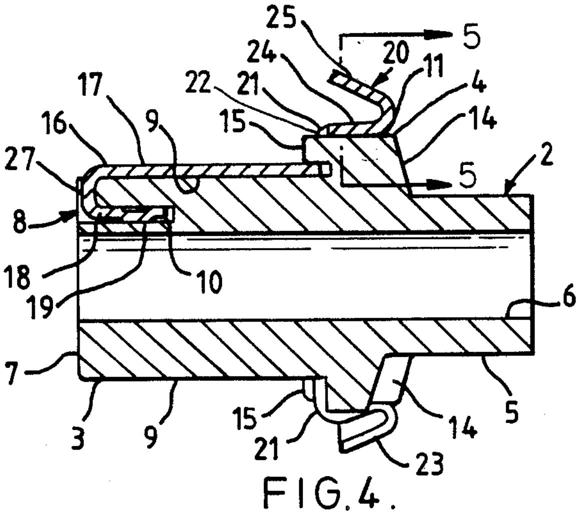
FIG. 4 is a cross-section along the line 4—4 of FIG. 2.
Figure 5:
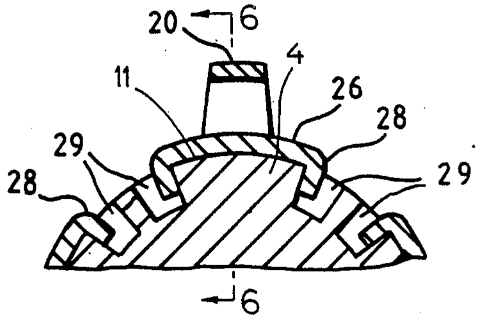
FIG. 5 is a cross-section along the line 5—5 of FIG. 4.

The base 2 carries five commutator segments 16. The segments are stamped from copper sheet and folded to shape. Each segment comprises an arcuate brush contacting portion 17 which sits on the surface 9. A reentrant tab 27 is formed at a front end of the portion 17. Tab 27 sits in a respective recess 8 and projects into an aperture 10. Ends 18 of the tabs 27 have a detent 19 to wedge the ends in the respective apertures 10 (FIG. 4).

A tang 20 is formed at the rear end of each brush contacting portion 17. A tang 20 comprises a radially extending wall 21 which is slightly narrower than the width of the portion 17. The wall 21 has, an aperture 22 which snugly receives a protrusion 15, the portion 17 fitting between the protrusion 15 and the surface 9 (see FIG. 4). A U-shaped wire receiving portion 23 is formed at the outer end of the wall 21. This has a first arm 24 which rests on the circumferential surface 11 of the collar 4 and a second arm 25 extending at an acute angle to the first arm 24. The first arm 24 is wider than the second arm 25 in the circumferential direction such that it has two "wings" 26 which extend to either side of the second arm 25 when it is pressed down onto the first arm.

Extending laterally from the wings 26 are arms 28. The arms 28 are folded into recesses 29 provided in the circumferential surface 11 of the collar 4. The arms 28 and recesses 29 are arranged so that an edge 30 of each arm abuts a wall 31, thus preventing movement of the segment in the axial direction, towards the end wall 7. By folding the arm 28 about a fold line having a component in the axial direction, any 'give' about the fold line will not affect the ability of the arm to prevent axial movement.

Figure 6:
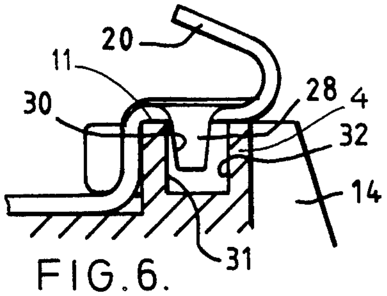
FIG. 6 is a cross-section along the line 6—6 of FIG. 5 on an enlarged scale.

It is particularly preferred that the edge 30 of the arm 28 be tapered (see FIG. 6) so as to progressively pull the segment tang wall portion 21 tightly against the wall 12 as the arm 28 is folded into the recess 29.

The arm 28 may be arranged to be a tight fit in the recess, so as to abut the wall 31 and opposite wall 32 to prevent axial movement in either direction.

The segments 16 are spaced apart on the surface of the cylindrical portion 3.

To assemble the commutator the segments 16 are slid onto the base 2 along the surface 9. Ends 18 of the tabs 27 are pushed into the apertures 10, the tang wall portions 21 sliding over the protrusions 15. The base 2 has chamfered edges at its front end (left-hand in FIGS. 1 and 4) to facilitate the mounting of the segments 16 thereon. The arms 28 are then pressed into the recesses 29 to lock the segments on the base. In use, the assembled commutator is mounted on a motor shaft, the extension 5 abutting the armature core. Coils are wound on the armature and the wire looped around respective tangs 20 at the end of each coil winding. The tangs 20 are hot forged or resistance welded to the wire in the usual manner, but with electrodes bearing on the arm 25, and, preferably, a forked electrode bearing on the wings 26 of the arm 24. Hence, heat evolved during the forging process is largely limited to the region of the collar 4.

It is usual to machine the surface of the segments 16 to ensure that the segments form a cylindrical surface to close tolerances. The walls 21 of the tangs 20 cooperate with the protrusions to limit circumferential movement of the segment ends against the collar 4 during machining, the tabs 27 fitting in the recesses 8 to limit movement at the other ends of the segments.

Various modifications may be made to the described embodiments and it is desired to include all such modifications as fall within the scope of the accompanying claims.

What is claimed is:

1. An assembled commutator comprising a cylindrical base of electrically insulating material, a plurality of commutator segments mounted on the base, each segment comprising a brush contacting portion which is supported by the base and a generally radially extending tang at one axial end of said brush contacting portion for connection to an armature coil wire, wherein the tang is formed locked to said base by a form locking connection, said form locking connection including an edge on a radially extending arm, said arm being folded about a line generally parallel to the axial direction of the base and behind a radially extending wall formed on the base so that said edge bears against said wall to prevent movement of the segment in a direction from said one axial end of said brush contacting portion towards an opposite end of the contacting portion.

2. A commutator as claimed in claim 1, wherein the tang has a U-shaped portion for receiving the armature coil wire, the cylindrical base having a collar which supports the U-shaped portion.

3. A commutator as claimed in claim 2, wherein the edge engages a wall of the collar to prevent said axial movement of the segment.

4. A commutator as claimed in claim 1, wherein the base is of crystalline polymer material.

5. A commutator as claimed in claim 1, wherein said edge is sloped relative to said radially extending wall on said base to urge said segment in a direction towards said one axial end of said brush contacting portion when said folded arm is behind said wall.

6. An assembled commutator comprising a cylindrical base of electrically insulating material, a plurality of commutator segments mounted on the base, each segment comprising a brush contacting portion which is supported by the base and a generally radially extending tang at one end of the brush contacting portion for connection to an armature coil wire, wherein a laterally extending arm is provided on each segment and said base defines a recess, a folded portion of said arm being received in the recess and an edge of said arm engaging a wall of said recess to prevent axial movement of the segment in at least one direction relative to the base.

7. A commutator as claimed in claim 6, wherein the tang comprises a U-shaped portion and the base includes a collar supporting the U-shaped portion with a part of the U-shaped portion resting on the collar, and wherein said arm extends laterally from said part of said U-shaped portion.

8. A commutator as claimed in claim 7, wherein said recess is in the collar, said folded portion of said arm is located in said recess in the collar.

9. A commutator as claimed in claim 7, wherein said tang of each segment defines an aperture and respective protrusions are provided on the collar, each protrusion being received int eh respective tang aperture to locate the associated segment on the base in the region of the collar.

10. A commutator as claimed in claim 6, wherein the base is of crystalline polymer material.

11. A commutator as claimed in claim 6, wherein said edge is sloped relative to said wall of said recess in said base to urge said segment in a direction towards said one axial end of said brush contacting portion when said folded arm is in said recess.

* * * * *